United States Patent [19]

Sargent

[11] Patent Number: 4,974,899
[45] Date of Patent: Dec. 4, 1990

[54] RECREATIONAL VEHICLE USE SYSTEM PARTICULARLY TANK INSTALLATION

[75] Inventor: Charles L. Sargent, Ann Arbor, Mich.

[73] Assignee: Thetford Corporation, Ann Arbor, Mich.

[21] Appl. No.: 440,664

[22] Filed: Nov. 22, 1989

Related U.S. Application Data

[60] Division of Ser. No. 382,052, Jul. 13, 1989, abandoned, which is a continuation of Ser. No. 195,464, May 13, 1988, abandoned, which is a continuation of Ser. No. 871,045, Jun. 5, 1986, abandoned.

[51] Int. Cl.$^5$ .............................................. B60R 15/04
[52] U.S. Cl. .................................. 296/156; 296/241; 296/37.1; 4/321; 4/378; 108/145
[58] Field of Search ............... 296/24.1, 37.1, 37.6, 296/156, 164, 168, 171, 208; 4/300, 321, 378, 459, 460; 108/145; 312/212

[56] References Cited

U.S. PATENT DOCUMENTS

| | | | |
|---|---|---|---|
| 4,185,340 | 1/1980 | Sargent et al. | 4/441 |
| 4,547,916 | 10/1985 | Henke et al. | 4/321 |
| 4,577,821 | 3/1986 | Edmo et al. | 108/145 |
| 4,641,383 | 2/1987 | Sargent et al. | 4/459 |

FOREIGN PATENT DOCUMENTS

| | | | |
|---|---|---|---|
| 922854 | 3/1973 | Canada | 4/300 |
| 2423561 | 11/1975 | Fed. Rep. of Germany | 296/171 |
| 2443606 | 3/1976 | Fed. Rep. of Germany | 296/156 |
| 83645 | 4/1983 | Italy | 296/156 |

OTHER PUBLICATIONS

Trav-L-on Product Catalog, 1976, pp. 109 and 119.

*Primary Examiner*—Denis H. Pedder
*Attorney, Agent, or Firm*—Harness, Dickey & Pierce

[57] ABSTRACT

The body of a recreational vehicle (RV) is configured to have a stowage compartment within the body's interior but separate from the interior occupant space. The stowage compartment contains a tank which serves water use fixtures in the interior occupant space. The stowage compartment is disposed adjacent the sidewall of the RV body and an opening is provided through the sidewall from the stowage space to the exterior. This opening is closed by a door. When the door is open, the tank can pass through the opening into and out of the stowage space. The tank can be either a fresh water tank containing a supply of fresh water for use at sanitary fixtures in the RV or alternatively it can be a waste water tank of either the gray water or black water type which collects waste from the water use fixtures.

4 Claims, 6 Drawing Sheets

RECREATIONAL VEHICLE USE SYSTEM PARTICULARLY TANK INSTALLATION

This is a division of U.S. Patent application Ser. No. 382,052, filed July 13, 1989 ABANDONED, which is a continuation of U.S. patent application Ser. No. 195,464 filed May 13, 1988, ABANDONED, which is a continuation of U.S. patent application Ser. No. 871,045, filed June 5, 1986, ABANDONED, entitled Recreational Vehicle Water Use Systems, Particularly Tank Installations.

BACKGROUND AND SUMMARY OF THE INVENTION

This invention relates to recreational vehicles such as motor homes, travel trailers and other camping vehicles, and is particularly concerned with new and unique installations for the tanks which are parts of the water use systems of such vehicles.

The typical recreational vehicle (RV) comprises a wheeled chassis on which a body is mounted. The body contains an interior space for use by occupants. RV's have come to enjoy increasing popularity over the years because of the many conveniences which they provide. Today many RV's are entirely selfcontained which means that they have not only their own living accommodations but all related conveniences as well. One of the conveniences is a complete self-contained water use system including sanitary fixtures such as sinks, showers, baths, toilets and the like. Fresh water for the system is contained in one or more fresh water storage tanks; waste liquid is stored in one or more holding tanks. Typically there are separate waste holding tanks for what are commonly respectively referred to as "gray water" and "black water" Gray water is waste water from sinks and showers whereas black water is waste from toilets.

In self-contained RV's it has heretofore been the practice to locate the fresh water storage tank inside the vehicle body where it is within the interior occupant space. Such tanks usually have generally rectangular shapes and are mounted on the body floor, for example, concealed beneath a bench or a cabinet.

Waste water tanks are exterior of the RV body, usually being suspended from the chassis below the body floor. Because of this, they often reduce the RV's road clearance in the area of the chassis where they are located They must be sufficiently strong to withstand damage from external forces such as rocks and stones for example.

The waste tanks have inlets which are in communication with outlets of the respective sanitary fixtures which they serve. Each waste tank has an outlet controlled by a gate valve. These gate valves usually connect to a common outlet to which a hose is attached for dumping. When the valves are opened, the tanks' contents drain through the hose. Because dumping of waste onto open ground is usually prohibited, the tanks are dumped either into an intermediate container which is then carried to the disposal site, or else by moving the RV to the disposal site. The valves and the related conduits are also exterior of the RV and hence subject to potential damage from external forces.

In general, neither fresh water tanks nor waste holding tanks are intended for removal. Since the waste holding tanks are disposed beneath the RV, they are removable only for service, and if at all, only by access to the undercarriage of the RV to separate the means of attachment allowing them to be dropped down for removal. In the case of a fresh water tank on the RV's interior, removal requires some interior part or parts of the body, such as a bench or cabinet, be first removed.

The present invention relates to a new and unique arrangement for the installation and removal of these types of tanks on recreational vehicles. According to general principles of the invention, a wall structure is disposed in cooperative association with the RV body floor and an adjacent exterior sidewall of the RV body to define a stowage compartment, or space, which is interior of the RV body but separated from the interior occupant space of the RV body. An opening is provided through at least one of the RV's sidewall and the floor, between the exterior of the RV body and the stowage compartment. This opening is typically rectangular in shape and is opened and closed by a door. The tank has a size and shape allowing it to pass bodily through this opening when the door is open. A disconnectable fluid connection is provided between the tank and the sanitary fixture, or fixtures, which it serves.

The invention is particularly advantageous because it provides for mounting of a tank in a location where it is not exposed to external forces, yet the stowage compartment is separated from the interior occupant space. The tank can be conveniently removed via the exterior of the RV, and hence there is no need to transport the tank through the interior occupant space for either installation or removal. This is especially desirable in the case of a waste holding tank. While general principles of the invention are applicable to tanks which are intended to be periodically removed from the vehicle, such as to dispose of accumulated waste contents for example, they are also applicable to tanks which are not intended for such periodic removal but rather which are removed at most for maintenance or other purposes on infrequent occasions.

Several embodiments of the invention are disclosed, and they possess further additional features unto themselves which will be considered in their detailed description.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
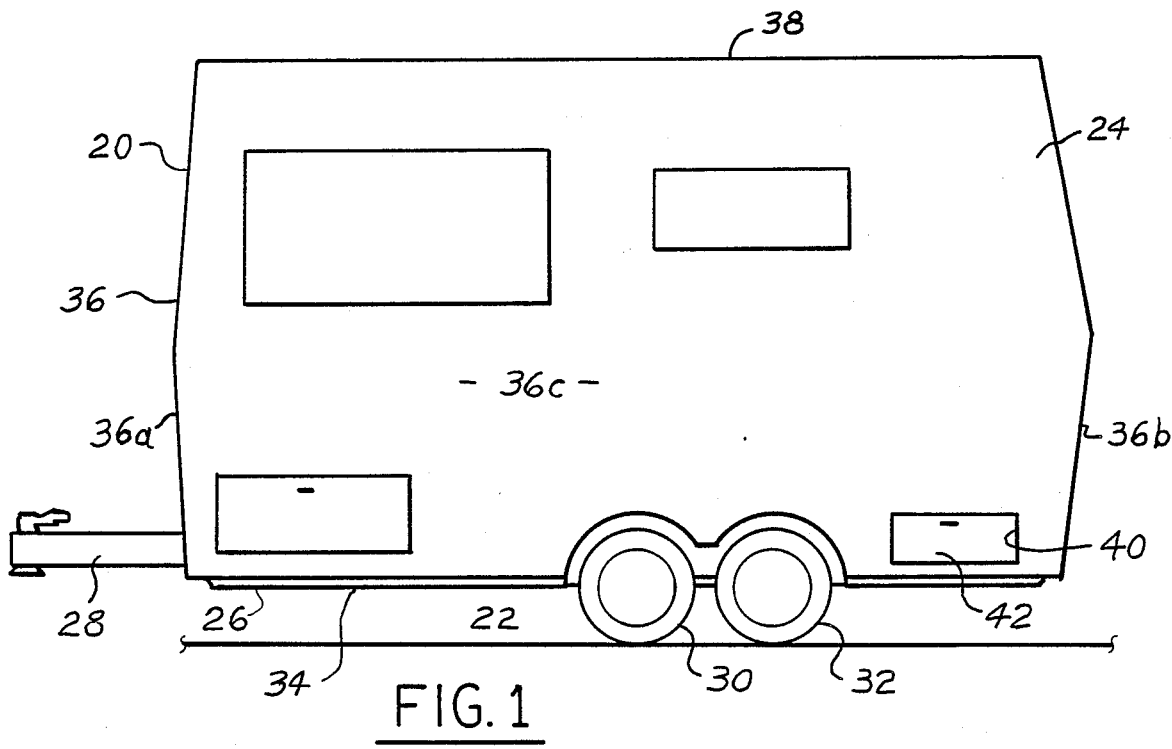
FIG. 1 is a side elevational view of a representative recreational vehicle embodying principles of the present invention.

FIG. 1 illustrates a representative recreational vehicle (RV) 20 which embodies principles of the invention. RV 20 is illustrated as a travel trailer which is adapted to be pulled behind a towing vehicle (not shown). Principles of the invention are applicable to other types of RV's including without limitation motor homes.

RV 20 comprises a wheeled chassis 22 on which is supported the RV body 24. Chassis 22 comprises a perimeter frame 26 having a tongue 28 at the forward end via which the trailer connects to the towing vehicle. The chassis further comprises tandem axles 30 and 32 which are supported from frame 26 by a suitable suspension system which may include leaf springs and shock absorbers.

Body 24, in general, comprises a floor 34, a vertical side 36, and a roof 38 forming an enclosure. The body is shown to be generally rectangular in shape although it is to be appreciated that any given body may have departures from such a shape. Side 36 comprises four sidewalls, namely a front 36a, a rear 36b and two lateral sidewalls 36c. It is one of these lateral sidewalls 36c which is viewed directly in FIG. 1, and it is arranged at a right angle to floor 34. Sidewall 36c is provided with a rectangular opening 40 which is shown in FIG. 1 to be closed by a door 42.

Figure 2:
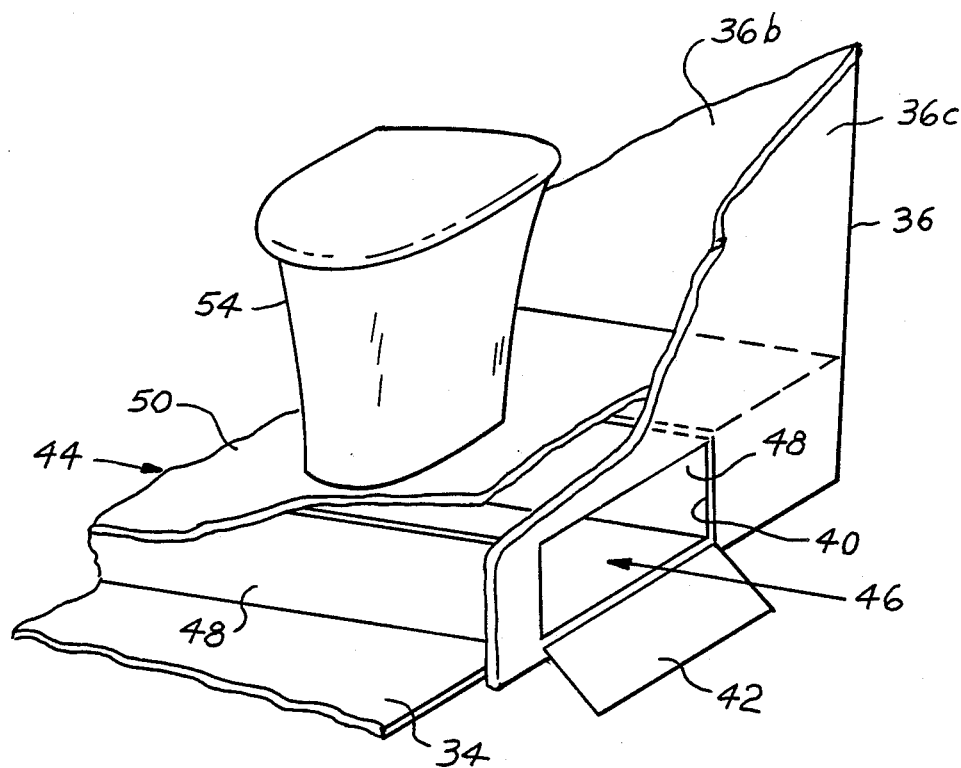
FIG. 2 is a fragmentary perspective view illustrating adaption of the RV of FIG. 1 in accordance with principles of the invention.
Figure 3:
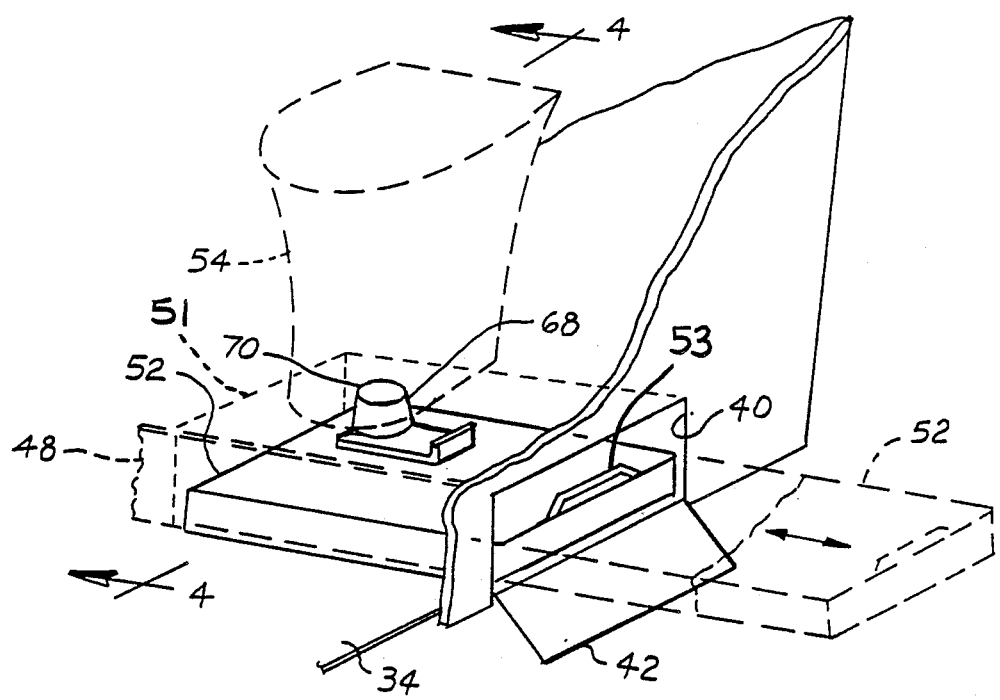
FIG. 3 is a view similar to FIG. 2 illustrating tank installation.

FIGS. 2 and 3 illustrate more detail of the RV body in the area of the left rear corner in the vicinity of opening 40. FIGS. 2 and 3 illustrate portions of the floor and sidewall broken away so that both interior and exterior of the body are seen. A wall structure 44 is cooperatively associated with floor 34 and side 36 on the interior of body 24 to form a stowage compartment 46. Stowage compartment 46 opens to the exterior of the body via opening 40 when door 42 is open.

Wall structure 44 comprises floor joists 48 which are spaced apart along the length of body 24 and which are disposed to lie perpendicular to the length of the body. Floor joists 48 serve to support a horizontal wall 50 whereby wall 50 and two consecutive joists 48 define the top and sides of stowage compartment 46. The bottom of the stowage compartment is defined by floor 34. The illustrated floor joists 48 and wall 50 may be part of more extensive like structure within body 24 such as the entire actual floor of the RV's interior occupant space, or they may simply be of a localized nature extending no farther than the definition of the stowage compartment The stowage compartment could span the full width of the RV's body; alternatively, a vertical member, such as 51, in FIG. 3 between joists 48 could close the end of the compartment opposite opening 40. In any event, stowage compartment 46 is open to the RV's exterior via opening 40, but it is segregated from the interior occupant space within the RV's body.

Stowage compartment 46 has a generally rectangular transverse cross sectional shape which is slightly larger than opening 40. The stowage compartment is adapted to receive a tank 52 which has a rectangular transverse shape just slightly smaller than the rectangular transverse shape of the stowage compartment. FIG. 3 shows tank 52 in its installed position in solid lines; the broken line position portrays the tank during processes of installation to and/or removal from the stowage compartment As can be appreciated, the tank is installed into and removed from the stowage compartment by bodily moving the tank lengthwise through opening 40 with door 42 open. Handle 53 is provided on tank 52 to facilitate handling of the tank. Once the tank has been installed within the stowage compartment, door 42 is closed. The door typically contains a lock or latch to keep it closed.

Figure 4:
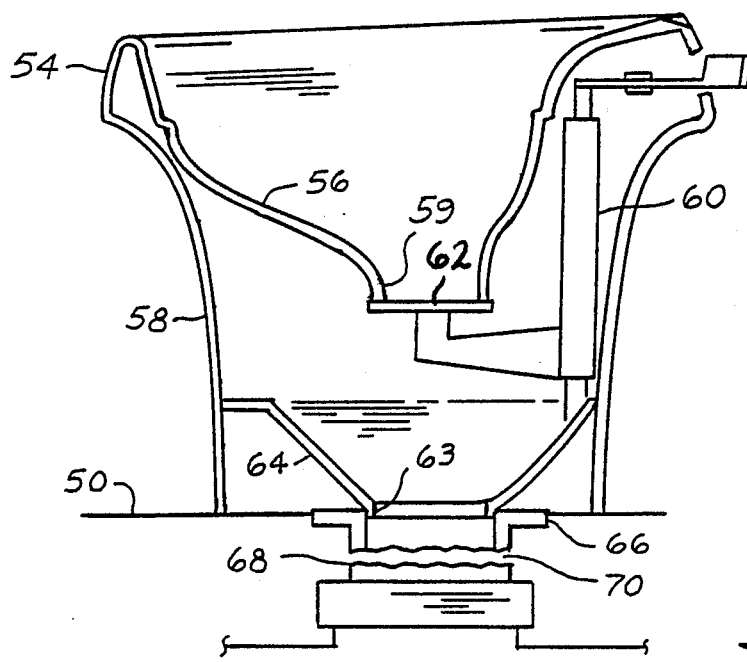
FIG. 4 is a transverse cross sectional view taken generally in the direction of arrows 4—4 in FIG. 3.
Figure 5:
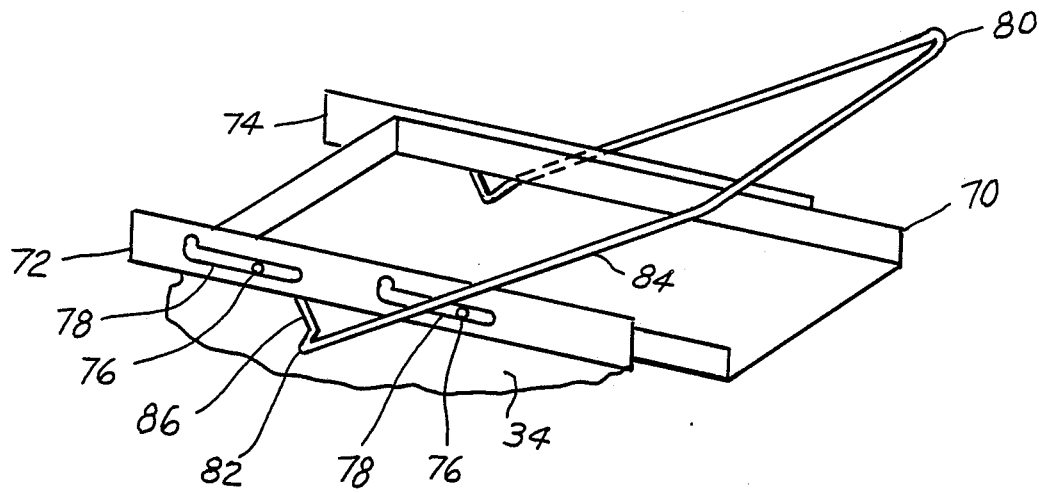
FIG. 5 is a perspective view of an apparatus which may be associated with the installation to facilitate usage.

In the installed position, the tank is connected for use with an associated water use fixture. The usage illustrated in FIG. 1 shows tank 52 as a black water holding tank for receiving waste from a toilet. The toilet 54 is shown on wall 50 directly above the installed tank. An example of a toilet 54 which is suitable for this type of use is illustrated in U.S. Pat. 4,185,340, commonly assigned. FIG. 4 shows representative detail.

The toilet comprises a bowl 56 which is secured within the top of an upstanding base 58. This base sits directly on wall 50. Bowl 56 comprises an outlet 59 at its bottom which is opened and closed by a valve and associated operating mechanism 60 generally. Details of the valve mechanism are explained in the reference patent. When the valve is closed, fresh water is introduced into the bowl and after use of the toilet, the water and waste contents are flushed from the bowl by opening the valve blade 62.

Bowl outlet 59 overlies a further open outlet 63 formed in a conically shaped lower wall 64, which is interior of base 58. This second outlet 63 fits in a sealed engagement with a closet flange 66 which is installed in a circular opening provided in wall 50. Hence waste which passes through the bowl outlet 59 will fall downwardly toward the conically shaped wall 64 and pass through the outlet 63 and closet flange 66. The closet flange is in registry with an opening into tank 52 so that the waste contents are thereby deposited into the tank.

The tank opening 68 has a disconnectable connection 70 with closet flange 66: for the illustrated usage as a black water holding tank, it is desirable that this connection be sealed. In this particular illustration the point of disconnection takes place below wall 50 so that it is in fact exterior of the interior occupant space but still within the RV body. Because the tank basically passes horizontally into and out of the stowage compartment via opening 40, the manner in which the connection and disconnection of its opening 68 to closet flange 66 may require some component of upward bodily displacement of the tank after its opening has been placed in vertical alignment with the closet flange. Whether such upward motion will in fact be necessary will of course depend upon the particular type of installation and connection, and it is to be appreciated that such upward bodily displacement may be unnecessary for some installations.

Figure 6:
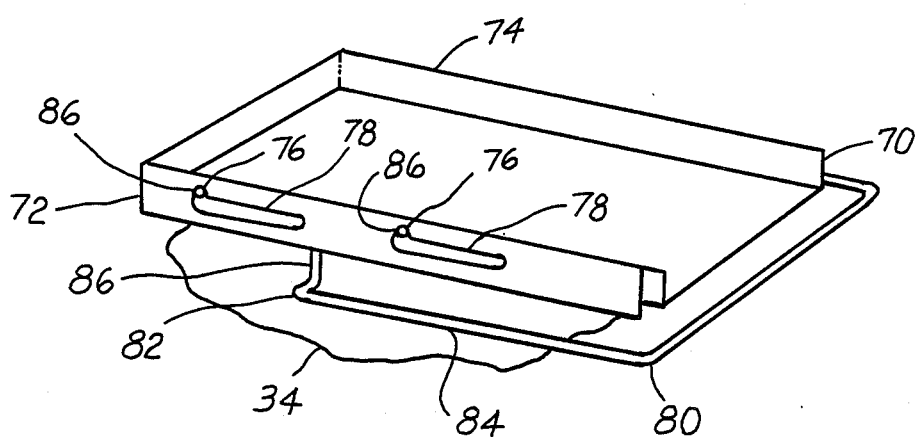
FIG. 6 is a perspective view illustrating an alternate position of operation of the apparatus shown in FIG. 5.
Figure 7:
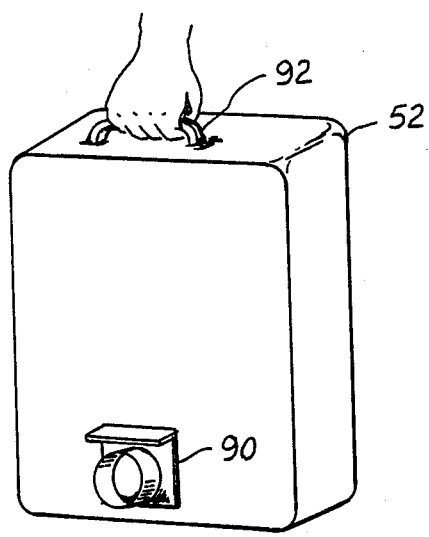
FIG. 7 is a view illustrating the tank having been removed from the RV.

If upward tank displacement is however needed, FIGS. 6 and 7 portray a mechanism which is capable of imparting such upwardly bodily displacement to the tank. Basically the mechanism comprises a tray 70 on which tank 52 is supported. The tray is in turn guided for horizontal motion into and out of stowage compartment 46 by a pair of tracks 72, 74 on opposite sides which are next to the respective joists 48. Tray 70 contains rollers 76 captured in slots 78 in the tracks.

Once the tray is fully horizontally positioned within the stowage compartment, after having transported the tank into the stowage compartment through opening 40, a lever mechanism 80 is operated to impart a slight amount of vertical elevation to the tray, and hence to the tank. This will move the tank's opening 68 up into sealed engagement with closet flange 66.

The lever mechanism 80 is shown pivotally mounted at 82 on floor 34 with a longer lever arm 84 projecting toward the opening for manual operation by an individual. As this longer lever arm 84 is pushed down, a shorter lever arm 86 underlying the tray swings in an arc imparting slight elevation to the tray and tank. The slots 78 which support the tray rollers 76 have short vertical segments 86 at their inner ends so that in response to the operation of the lever in the manner just described, the tray and the tank will move vertically upwardly The tank will typically be empty during installation and therefore the operation of the lever will not require any significant amount of effort.

When the tank is to be removed, it may have a considerably greater weight due to its waste contents and so will assist in dropping the tray, and hence the tank, out of its sealed engagement with the closet flange when the lever mechanism is operated in the opposite manner from that just described. The lever mechanism may be provided with some type of a latch or over-center mechanism which is effective to keep the elevated tray and tank in that position as waste contents accumulate in the tank. This will prevent the weight acting on the tray from unintentionally dropping the tray and tank from the elevated position.

FIG. 7 shows tank 50 to have its own valve 90 for opening and closing its opening 68. The tank is also equipped with one or more handles 92 to facilitate not only the manipulation of the tank into and out of the stowage compartment, but also for use in transporting the tank to a waste disposal facility. FIG. 7 shows valve 90 in the closed position, and an individual carrying the tank by one of the handles.

At the waste disposal facility, the contents of the tank may be dumped by opening valve 90 and pouring the contents out through opening 68. Alternatively a separate pourout opening or spout closed by a removable cap may also be provided on the tank. Whether such an additional outlet opening or spout is necessary will depend upon the particular location where the tank opening is located on the tank. If it is located at a corner, pouring of the waste contents from the tank is more convenient than if the opening is at the center.

In any event, the ease with which the tank can be removed, installed, and carried by an individual demonstrates important advantages of the invention. The invention contributes to a more efficient construction for an RV because the exterior holding tanks can now be eliminated. Likewise an RV can be left at a camping site without the need to move it for periodic dumping of tanks which might be required where the tanks are not conveniently removable.

Figure 8:
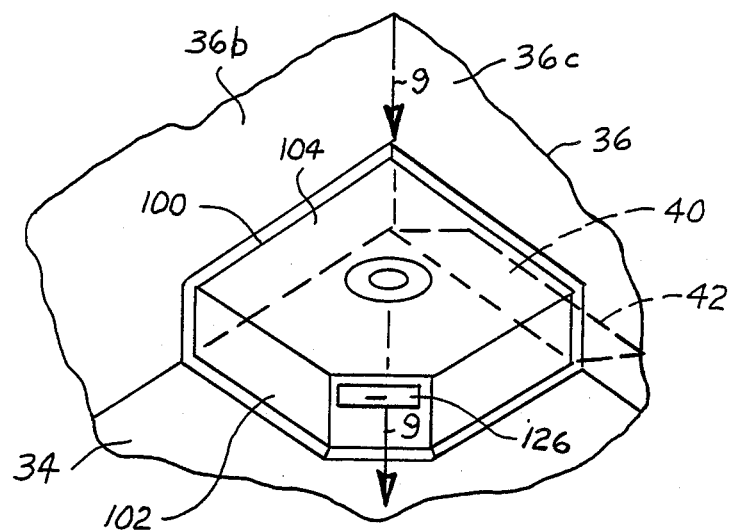
FIG. 8 is a fragmentary perspective view of an adaptation of an RV body for another embodiment of the invention.
Figure 9:
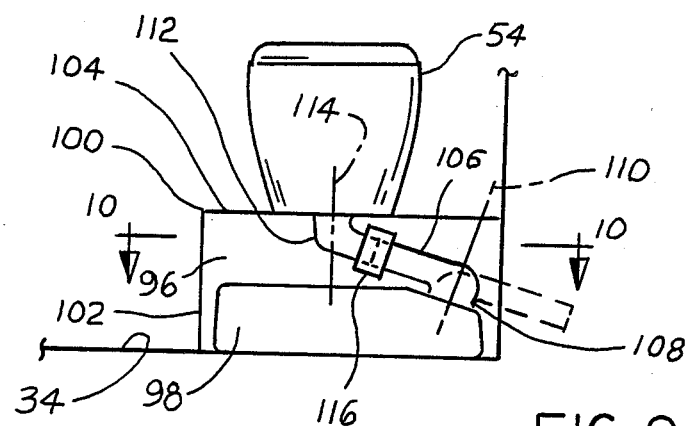
FIG. 9 is a transverse cross sectional view taken generally in the direction of arrows 9—9 in FIG. 8 but with further details.
Figure 10:
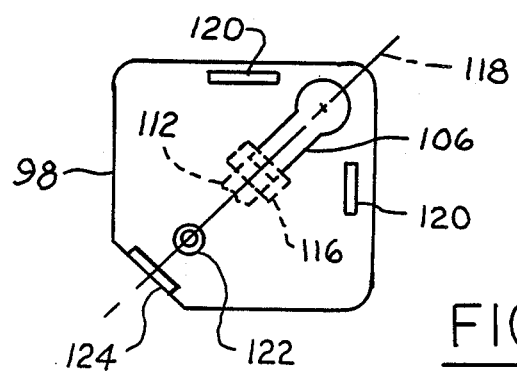
FIG. 10 is a top plan view taken generally in the direction of arrows 10-10 in FIG. 9.

FIGS. 8, 9 and 10 illustrate a further embodiment of the invention. In this embodiment a stowage compartment 96 for a tank 98 is cooperatively defined between floor 34 and side 36 by a corner-mounted plinth 100. Plinth 100 comprises a sidewall 102 and a top wall 104 which separate stowage compartment 96 from the RV's interior occupant space while the stowage compartment is nonetheless still within the interior of the trailer body. The plinth may be flanged as shown for attachment and preferably includes suitable sealing provisions around its edges. A toilet of the same type 54 is shown mounted on the top of plinth 100. However the manner in which the connection of the toilet is made to the tank is quite different from the preceding embodiment of FIGS. 3 and 4.

While tank 98 still has a general overall rectangular shape it is essentially square shaped and shallower, as can be seen in FIG. 10. It also comprises a swivel spout 106 which has a swivel mounting 108 about an inclined axis 110 to the top wall of the tank at one corner. The outlet of the toilet is equipped with a swivel elbow 112 which swivels about a vertical axis 114. The free ends of the swivel spout and the swivel elbow are adapted to connect together In the installed position, the swivel elbow is in alignment with the swivel spout and the two are connected by a union nut 116 which threads onto the threaded end of the swivel spout. The union nut is accessible through opening 40 and may be unthreaded to separate the swivel elbow from the swivel spout, allowing the tank to be removed through opening 40. The union nut remains with the swivel elbow after the connection has been broken while the swivel spout remains on the tank.

Because of the symmetry involved about a vertical plane 118 which is at 45° to the corner, the tank could be removed if opening 40 were in the contiguous rear sidewall 36b instead of 36c. With this in mind, the tank is provided with a pair of handles 120 as shown so that it may be used regardless in which of the two corner walls the opening 40 is located.

After disconnection of the swivel elbow from the swivel spout, the tank may be carried to a waste disposal site for dumping. Dumping is accomplished by rotating the spout 106 such as to the broken line position in FIG. 9 and aiming it into the waste disposal site. To facilitate emptying of the tank contents, a manually operable venting valve 122 may also be provided. In certain respects the spout and the venting valve are like those illustrated in U.S. Pat. No. 4,641,383 commonly assigned.

Installation of tank 98 into the stowage compartment is accomplished in the opposite manner by returning spout 106 to the position shown in FIG. 10. As the tank is inserted into the stowage compartment, the free end of the spout will come into alignment with the free end of the swivel elbow, and union nut 116 is then tightened to thread onto the threaded end of spout thereby completing the connection. In this embodiment there is no need to make any provision for vertically elevating the tank after it has been inserted into the stowage compartment.

The tank's attachment to the swivel elbow will in certain respects serve to secure the tank against horizontal displacement within the storage compartment. The plinth and the adjacent sidewalls also serve to provide constraint against horizontal displacements in the same manner as the joists do for the tank in FIGS. 3 and 4. If necessary, additional retention means (not shown) may be employed in association with the installed tank if these are deemed advisable. For example hold-downs to the floor and/or wedges may be used.

Although the removal of tank 98 from the stowage compartment will initially have the end of the swivel spout open, there may be a cap (not shown) available for threading onto the threaded end of the spout during transport of the tank to a waste disposal facility if use of such a cap is deemed desirable. At the disposal facility, the cap is removed so that the contents of the tank can be poured out but should be brought back to the RV to be available for use at the next time that the tank is removed for dumping.

Figure 11:
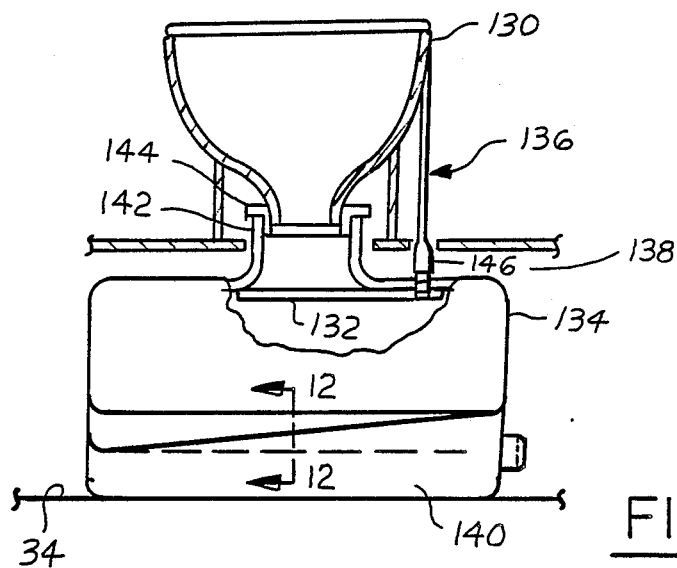
FIG. 11 is a sectional view similar to FIG. 3 illustrating a further embodiment of the invention with the tank fully installed.
Figure 12:
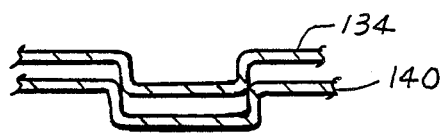
FIG. 12 is a transverse cross sectional view taken in the direction of arrows 12—12 in FIG. 11.
Figure 13:
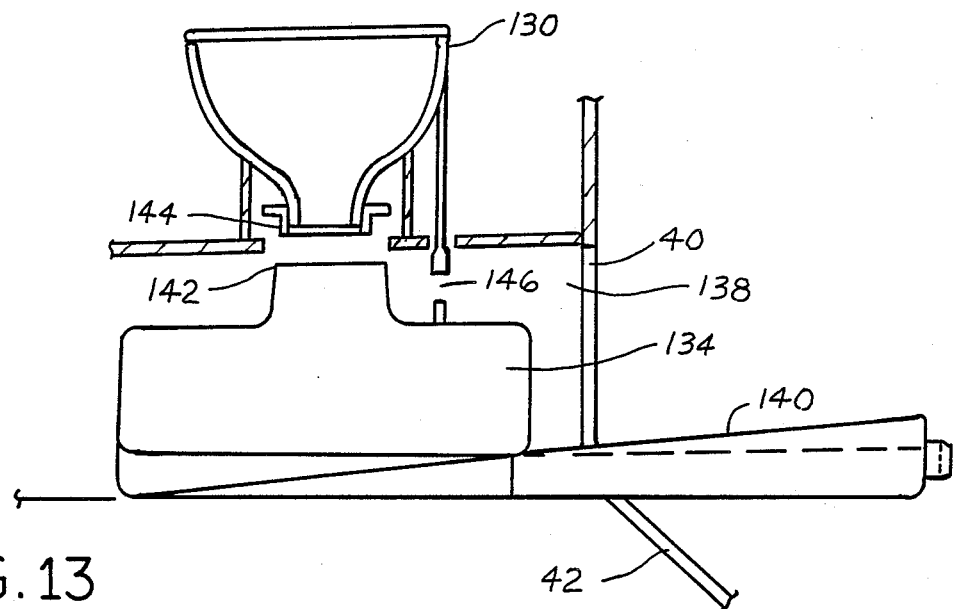
FIG. 13 is a view similar to FIG. 11 but showing the tank displaced from the fully installed position of FIG. 11.

The tank may comprise a gage 124 which indicates the liquid level in the tank, and the plinth may be provided with a transparent window 126 through which this gage can be viewed from the interior occupant space of the RV. FIGS. 11, 12 and 13 portray a still further embodiment of the invention with a somewhat different type of toilet 130. There is no flush valve in toilet 130 itself. Rather the valve 132 is incorporated into the holding tank 134. The valve operating mechanism 136 may be similar to that described in the reference patent but there is provided a means for making and breaking of the connection in the valve actuator mechanism when the tank is installed in and removed from the stowage compartment 138.

In this embodiment it is necessary, once the tank is in its aligned position below the bowl, for the tank to be bodily displaced upwardly. This is accomplished by means of a wedge 140 which fits between the bottom of the tank and the floor 34. The wedge is movable into and out of stowage compartment 138 through the opening 40. In the position shown in FIG. 11, the wedge is directly below the tank where it has caused the tank to be displaced upwardly to bring the tank opening 142 into a sealed engagement with the bowl outlet 144 and to also cause connection to be made in the actuating mechanism at 146. When the wedge is removed, as in FIG. 13, the tank can drop down whereby breaking the connection between bowl outlet 144 and tank opening 142, and the connection in the actuating mechanism at 146 between the tank-mounted valve and the toilet-mounted operator The point of connection and disconnection 146 in the valve operating mechanism may be in the nature of interfitting shafts which are keyed and/or splined, for example. Once the wedge has been removed, the holding tank can likewise be removed through opening 40 for dumping. The same considerations for dumping that were described earlier apply to tank 134. FIG. 12 illustrates a representative cross section through the wedge and tank.

While the illustrated examples have portrayed tank installations involving waste holding tanks for black water, certain principles of the invention also apply to gray water holding tanks and to fresh water tanks, particularly the general principles for tank stowage and removal.

What is claimed is:

1. In a recreational vehicle which comprises a wheeled chassis on which a vehicle body is supported, said body comprising a horizontal floor which overlies the chassis and a vertical sidewall which extends upwardly from the floor, said floor and sidewall being exterior walls of said body, said body having an occupant space which contains a water use sanitary toilet, the improvement which comprises wall means cooperatively associated with said floor and sidewall to form a stowage compartment in the interior of the body but separated from said occupant space, said toilet being coupled with said wall means and said stowage compartment being positioned below said toilet, said toilet having a bowl with an open lower end for discharge of waste from said bowl, an opening between said stowage compartment and the exterior of the body, a closure for opening and closing said opening, a liquid waste tank within said stowage compartment for collection of waste water which has been used in the sanitary toilet bowl, said tank being positioned within said stowage compartment and hidden from view in said occupant space by said wall means, said tank having a size and shape which allows it to pass bodily through said opening when said closure opens said opening, said tank and said toilet bowl being relatively located when said tank is positioned within said stowage compartment so that waste can pass downwardly from the toilet bowl into the tank, an opening in said tank through which said waste passes into said tank, a valve disposed on said tank which opens and closes said tank opening, said valve, when open, enabling said waste from said toilet bowl to enter said tank and said valve when closed, sealing the tank contents from the stowage compartment and closing said tank opening to enable said tank to be removed from said stowage compartment without spillage of the tank contents, and an operator for said valve which is accessible from within said interior occupant space.

2. The improvement set forth in claim 1 further comprising a disconnectable fluid connection between said tank and said toilet bowl which when connected enables waste to pass from said toilet into said tank and when disconnected allows said tank to be bodily removed from said stowage compartment.

3. The improvement set forth in claim 2 further comprising a coupling means between said operator and valve which includes a separable connection.

4. The improvement set forth in claim 3 in which the separable connection of said coupling means connects and disconnects

* * * * *

UNITED STATES PATENT AND TRADEMARK OFFICE
CERTIFICATE OF CORRECTION

PATENT NO.  : 4,974,899
DATED       : December 4, 1990
INVENTOR(S) : Charles L. Sargent It is certified that error appears in the above-indentified patent and that said Letters Patent is hereby corrected as shown below:

Column 8, Line 55, Claim 4, after the word "disconnects", insert
    --concurrently with the connection and disconnection of said
      fluid connection.--.

Signed and Sealed this

Fourth Day of June, 1996

Attest:

BRUCE LEHMAN

Attesting Officer          Commissioner of Patents and Trademarks